United States Patent
Chakra et al.

(10) Patent No.: US 8,560,606 B2
(45) Date of Patent: Oct. 15, 2013

(54) SOCIAL NETWORK INFORMED MASHUP CREATION

(75) Inventors: Al Chakra, Apex, NC (US); John K. Gerken, Apex, NC (US); Ruthie D. Lyle, Durham, NC (US); Mark Maresh, Rochester Hills, MI (US); Eric A. Stegner, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 12/917,193

(22) Filed: Nov. 1, 2010

(65) Prior Publication Data

US 2012/0110073 A1    May 3, 2012

(51) Int. Cl.
*G06F 15/16* (2006.01)
(52) U.S. Cl.
USPC .......................................... 709/204; 705/319
(58) Field of Classification Search
USPC .......................................... 709/204; 705/319
See application file for complete search history.

(56) References Cited

U.S. PATENT DOCUMENTS

| | | | |
|---|---|---|---|
| 2007/0050446 A1* | 3/2007 | Moore | 709/203 |
| 2008/0154739 A1* | 6/2008 | Kalaboukis | 705/26 |
| 2008/0162275 A1* | 7/2008 | Logan et al. | 705/12 |
| 2009/0157630 A1 | 6/2009 | Yuan | |
| 2009/0204594 A1* | 8/2009 | Akkiraju et al. | 707/5 |
| 2009/0265760 A1 | 10/2009 | Zhu et al. | |
| 2009/0299990 A1* | 12/2009 | Setlur et al. | 707/5 |
| 2010/0329633 A1* | 12/2010 | Lafond et al. | 386/241 |
| 2010/0333154 A1* | 12/2010 | Dasher et al. | 725/98 |
| 2011/0296476 A1* | 12/2011 | Rouse et al. | 725/109 |

FOREIGN PATENT DOCUMENTS

| | | |
|---|---|---|
| WO | WO2009006606 | 1/2009 |
| WO | WO2009149063 | 12/2009 |

\* cited by examiner

*Primary Examiner* — Thomas Dailey
(74) *Attorney, Agent, or Firm* — DeLizio Gilliam, PLLC

(57) ABSTRACT

A plurality of mashups created by a plurality of mashup authors indicated as being in a community relevant to a mashup based, at least in part, on social network data are identified in response to indication of a mashup building operation. Frequencies of a plurality of mashup configurations used by the plurality of mashup authors in the plurality of mashups are determined according to data about the plurality of mashups. A set of one or more recommendations that are associated with a set of one or more of the plurality of mashup configurations is generated for the mashup.

35 Claims, 6 Drawing Sheets

SOCIAL NETWORK INFORMED MASHUP CREATION

BACKGROUND

A mashup builder is an application or tool that facilitates the creation of mashup applications by end users. Mashup builders can be web-based or written to execute in a desktop operating system. A mashup builder builds a mashup application ("mashup") from multiple services and/or data sources ("content generators"). Data or content from the content generators are combined or manipulated to create another service. Mashups often employ widgets to import, manipulate, and display the content. Widgets that display content control the presentation characteristics of content from a given content generator (i.e., a URI addressable source). Widgets can use a publisher/subscriber technique to self-identify notifications and content types that they are either able to publish or are interested in receiving.

Generally, users create a new mashup by starting with a blank design canvas. A user places one or more widgets within the design canvas, and saves the collection of widgets as placed on the design canvas as a mashup. Saved mashups can often be viewed as Web pages or incorporated into other applications. Communications with and among widgets are either automatically determined (some widgets can detect other "compatible" widgets and automatically communicate) or are user specified through the design interface. A user can save a constructed mashup and publish it to a server. Each time the mashup is used, the widgets of the mashup can pull content from their respective content generators and can communicate with each other through their publisher/subscriber technique. Mashups represent a powerful paradigm of customized Web application development, which is quick, leverages existing resources, and permits a user set having minimal software development knowledge to create robust, customized Web applications.

SUMMARY

Embodiments include a method informing building of a mashup with social network data. A plurality of mashups created by a plurality of mashup authors indicated as being in a community relevant to the mashup based, at least in part, on the social network data are identified in response to indication of a mashup building operation. Frequencies of a plurality of mashup configurations used by the plurality of mashup authors in the plurality of mashups are determined according to data about the plurality of mashups. A set of one or more recommendations that are associated with a set of one or more of the plurality of mashup configurations is generated for the mashup.

Embodiments also include a computer program product for informing building of a mashup with social network data. The computer program product comprises a computer readable storage medium having computer readable program code embodied therewith. The computer readable program code comprises computer readable program code configured to identify at least one of a mashup topic and a mashup author identifier associated with a mashup. A plurality of mashups built by a plurality of mashup authors that correlate with the mashup author are determined based, at least in part, on social network data of the mashup author. Statistical data about mashup configurations of the plurality of mashups are examined. A set of one or more of the mashup configurations is recommended for the mashup based, at least in part, on the statistical data.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
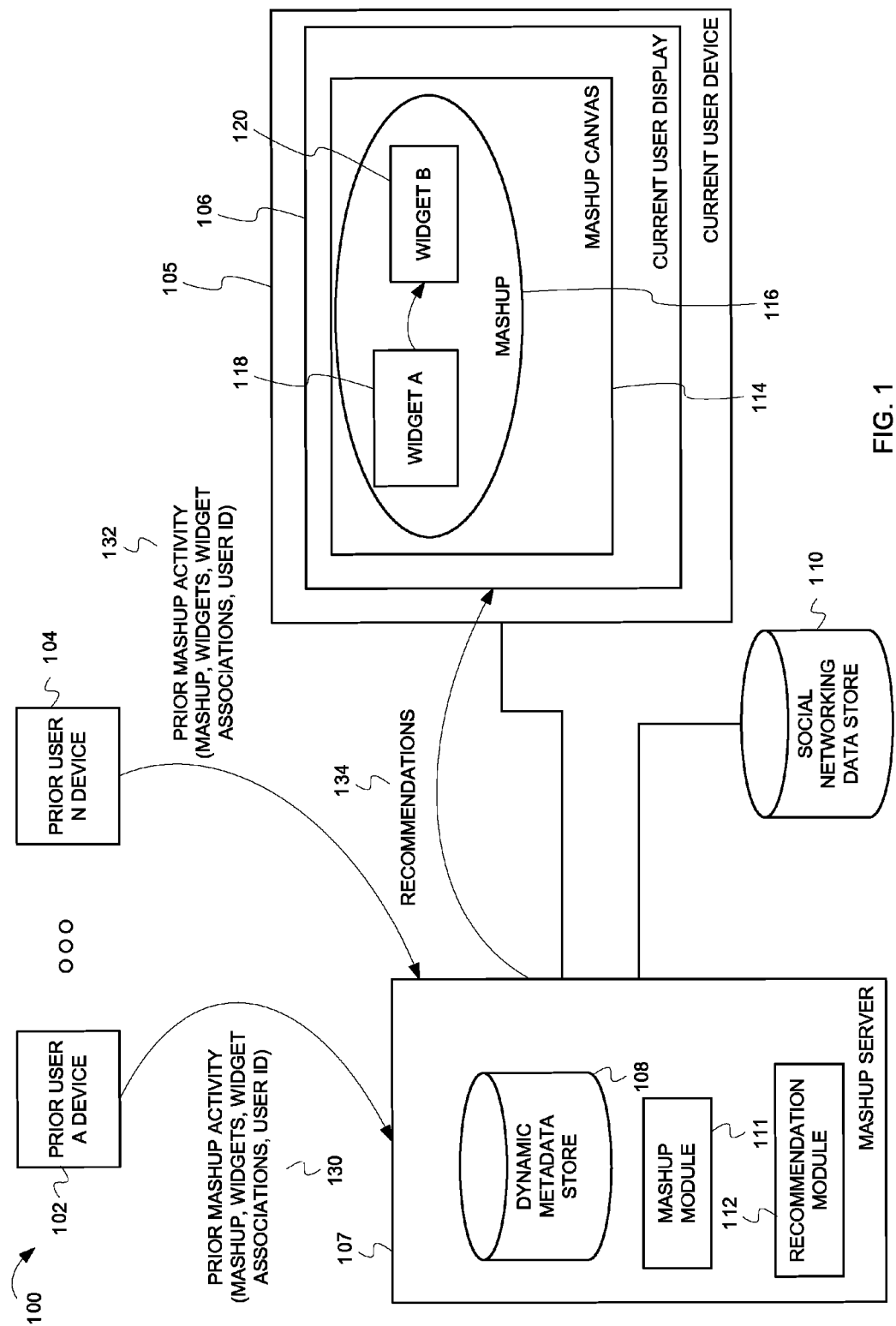
FIG. 1 depicts a conceptual diagram of example device communications for social network guided mashup creation

The description that follows includes exemplary systems, methods, techniques, instruction sequences, and computer program products that embody techniques of the present inventive subject matter. However, it is understood that the described embodiments may be practiced without these specific details. For instance, embodiments should not be limited to a colloquial or popular understanding of the term "widget," which is used throughout the specification. The term "widget" is used herein to refer to program code that performs at least one of query a content generator, import content from a content generator, format content received from a content generator, export content to another widget and/or to a content generator, and manipulate content from a content generator and/or from another widget. In addition, a widget is not necessarily visible to an end-user of a mashup that comprises the widget. In other instances, well-known instruction instances, protocols, structures, and techniques have not been shown in detail in order not to obfuscate the description.

Some example embodiments enable business end users to easily create mashups on their own. A user can benefit from the prior work and experience of other users that create mashups ("mashup authors"). As mashup authors build mashups, the frequency and manner of use of mashup resources (e.g., data sources, data mashups, widgets) can be tracked and analyzed. Data derived from the tracking and analysis can provide empirical indicators of the quality of a given resource, related resources and other resources that work well with the given resource. Further, a user can leverage the experience of mashup authors within the user's social network(s), which can improve the efficiency and effectiveness of creating mashups for that user. The efficiency and effectiveness can be gained, at least partly, because people within the user's social network are likely to use similar mashup resources and perform similar mashup tasks. Accordingly, this system can harness the experience of the aggregate users of a mashup ecosystem (i.e., system formed of mashup users/builders, mashup resources, and platforms) and the experience of targeted user groups that can be applied to the next generation of mashup authors.

For example, assume that a mashup author pulls, onto a design canvas, a movie location widget encapsulating local movie data and a map widget to display the relative locations in which a given movie is showing. Also, assume that the map widget requires latitude/longitude data and assume that the movie location widget only provides address data. If the two widgets were associated such that the output of the movie location widget is inputted into the map widget, an error would occur. A third widget (a geocoding widget) is needed to translate the address data into latitude/longitude data. In some example embodiments, after dragging the movie location widget and the map widget onto the canvas, the system would provide a recommendation to include the third widget to provide the translation. The system can also recommend other widgets that had been successful with the movie widget. In some example embodiments, the recommendations can be rated by frequency used and display the widgets in a manner such that the system can effectively guide the user and significantly reduce the opportunity for error.

In some example embodiments, social networking is incorporated into the mashup creation process. Such social networking can segment associations between widgets based on identified interest groups relative to the current user. The granularity and reliability of the recommendations can be further enhanced because the group of users providing the recommendations has been identified by the current user as similar in focus to the task the current user is trying to complete. For example, users who are astrophysicists, new parents, teachers, etc. can benefit from the targeted use of this system by others of like minds or tasks. In particular, users of a particular group are more likely to create mashups that are similar in function, design, etc. Accordingly, receiving recommendations based on such targeted groups can be very useful for a current user.

In some example embodiments, after a user successfully associates two widgets in a mashup, metadata regarding the relationship between the two widgets is collected and stored. The metadata can comprise the names of the two widgets, the data types exchanged, the direction of the message/event facilitating the association, user name, social networking aspects (e.g., friends, networks, profile data, etc.), etc. The metadata can be stored in a dynamic data store and relevant heuristics (e.g., frequency of association between the two widgets, number of associations by the user, etc.) can be updated.

When a user is building a mashup with a mashup builder, the mashup builder can identify compatible widgets. The mashup builder can determine compatibility based on messaging configuration (e.g., expected parameters) and data format. The mashup builder can also identify widgets based on frequency of use/association with a currently selected widget and/or the widgets on the design canvas. The frequency of use/association can be determined from a community of other mashup authors in one or more of the social networks of the user. The mashup builder can also identify widgets for the user based on frequency of use by the other mashup authors in the social network(s) for a similar problem (e.g., similarity of purpose or widget description). The mashup builder can also filter and prioritize the identified widgets (e.g., ranking widgets by frequency). When the user looks to a palette for a widget to place on the mashup design canvas, recommendations can be retrieved to present to the user based on the previous work of the other mashup authors. Those recommendations can be based on the type of mashup the user is building, the subject matter of the mashup, the current widgets already in use, the widgets that previous users have successfully used with those existing widgets, etc. These recommendations can be particularly useful when business users are attempting to solve specific business challenges, because such recommendations provide the opportunity for more targeted and useful widget interactions.

Mashup creation and social networking can support highly diverse constituencies. Therefore, some example embodiments help focus the user by identifying widgets and connections from a wide array of resources that are most useful to a given individual. For example, assume a user of a social networking website (e.g., Facebook, MySpace, etc.), who is a car enthusiast living in Louisville, Ky., wishes to build a mashup involving classic cars. A mashup builder can provide mashup recommendations (e.g., widgets) based on mashups created by other self-identified car enthusiasts, persons living in Louisville, Ky. or both. In another example, in government, a mashup builder can recommend widgets to an intelligence officer building a mashup regarding bioterrorism based on mashups developed by persons with a background in medicine for. In another example, a mashup builder can recommend widgets to an auto designer or service technician based on mashups developed by other auto designers or service technicians in the auto industry. In another example, a mashup builder in a retail store environment can recommend widgets to procurement specialists or store managers based on mashups developed by other procurement specialists or store managers in the retail industry.

Accordingly, a mashup builder that leverages mashup experience of specified communities of mashup authors provides a user among a significantly large and diverse population to receive an improved user experience through filtered, focused and prioritized recommendations regarding widgets to use for a given task, how to wire widgets together, etc. These recommendations can be provided by tracking widget use, associations, etc. along with the user involved. Future users can then use these recommendations. Recommendations can be prioritized and filtered based on like or specific attributes of prior users using social networking. A user can set priorities to determine how recommendations are sorted, override those priorities, turn off the recommendations entirely, etc. In some example embodiments, the user can perform an action (e.g., button selection) to expose those widgets, associations, etc. already present within the mashup that matches those that are provided by the recommendations.

FIG. 1 depicts a conceptual diagram of example device communications for social network guided mashup creation. FIG. 1 depicts an ecosystem 100 that includes prior user devices (a prior user A device 102, a prior user N device 104, etc.) and a current user device 105. While shown with two prior user devices and one current user device, the ecosystem 100 can include one to N number of the prior user devices and one to N number of current user devices. The devices 102-104 and 105 can be any type of computing devices that can be used to create and update mashups. For example, the devices 102-104 and 105 can be desktop computers, different types of mobile devices (e.g., notebook computers, different types of smart telephones (e.g., Personal Digital Assistants, etc.), etc. In this example, the prior user devices 102-104 perform mashup activity (e.g., create, update, etc.) that are subsequently used to provide recommendations to a current user of the current user device 105. In particular, the previous mashup activity of the prior users helps to focus the current user by identifying mashups and widgets/associations in mashups from a wide array of resources that are most useful.

The current user device 105 includes a current user display 106 having a mashup canvas 114. The mashup canvas 114 can be part of a software application to enable the current user to create and update mashups thereon. In this example, the mashup canvas 114 includes a mashup 116 having a widget A 118 that is associated with a widget B 120.

Figure 2:
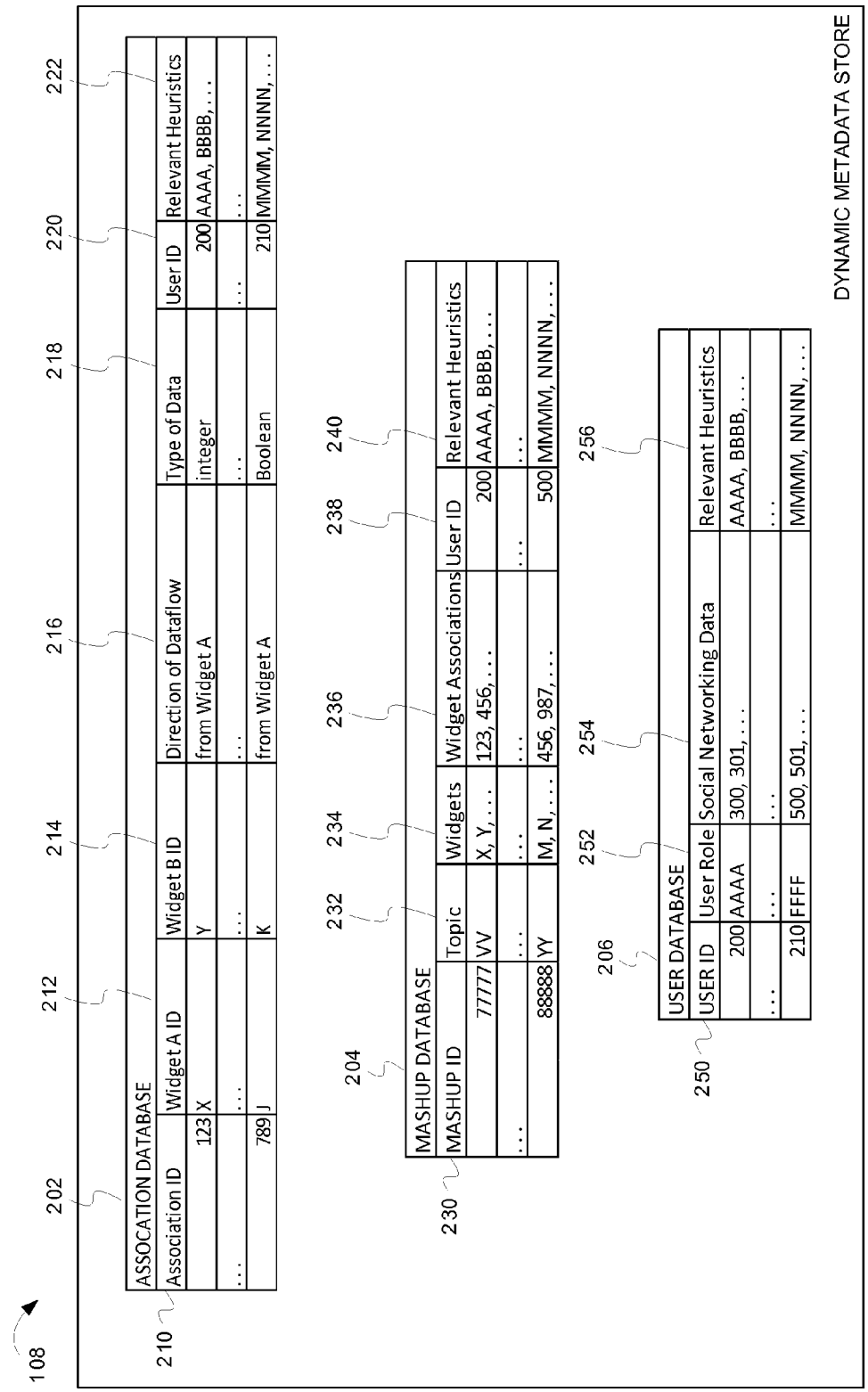
FIG. 2 illustrates a dynamic metadata store, according to some example embodiments.

The system 100 also includes a mashup server 107 that includes a dynamic metadata store 108, a mashup module 111, and a recommendation module 112. The dynamic metadata store 108 can be any type of nonvolatile machine-readable media. For example, the dynamic metadata store 108 can be representative of any type of persistent storage (e.g., magnetic-based hard disks, optical discs and flash memory). The dynamic metadata store 108 is configured to store various types of metadata relating to mashups (as further described below). The data stored in the store 108 can be considered dynamic because the data changes as data from other mashup activity from various users is added therein. FIG. 2 that is further described below illustrates a dynamic metadata store 108, in accordance with some example embodiments. The mashup module 111 and the recommendation module 112 can be software, hardware, firmware or a combination thereof. The operations of the mashup module 111 and the recommendation module 112 are further described below.

As shown, the prior user A device 102 transmits (to the dynamic metadata store 108) prior mashup activity data 130 (e.g., mashup topic, widgets, widget associations, user identification, etc.). The prior user N device transmits (to the dynamic metadata store 108) prior mashup activity data 132 (e.g., mashup topic, widgets, widget associations, user identification, etc.). In some example embodiments, the prior mashup activity 130 and the prior mashup activity 132 are transmitted as a result of a mashup operation by the prior user A and the prior user N, respectively. Examples of prior mashup activity can include creating a mashup, adding a widget to a mashup, adding an association between two widgets, defining the messaging between two widgets based on the association, etc. The mashup module 111 receives and stores the prior mashup activity data 130, 132 from users into the dynamic metadata store 108. The mashup module 111 also retrieves social networking data from a social networking data store 110. The social networking data can be for the prior users or the current user. The social networking data can comprise a user role (e.g., a user's profession), the friends of the user, the associations that the user has joined, etc. As further described below, this social networking data can be used to assist in providing mashup recommendations that are tailored to the current user.

The recommendation module 111 provides recommendations 134 to the current user device 105. In some example embodiments, these recommendations are provided in response to a current user performing a mashup operation. For example, the recommendations 134 can be provided in response to the current user creating a mashup, adding a widget to a mashup, adding an association between two widgets of a mashup, moving a mouse cursor over a widget in a palette of a mashup builder, etc.

Although FIG. 1 describes an example of devices sending mashup activity data to a centralized database, embodiments are not so limited. A database of information about widgets, widget associations, mashups, and mashup authors can be distributed across different service/content providers. The database of information can be aggregated into a clustered database of a single content/service provider. In addition, an organization can extract particular information about widgets, widget associations, mashups, and/or mashup authors from various providers and maintain a custom store of information. Further, mashup activity data is not necessarily transmitted responsive to mashup authors creating or modifying mashups. Embodiments can crawl over mashup metadata or mashups themselves to collect information about any one of widgets, widget associations, mashups, and mashup authors. Some data can be stored in the widgets themselves. For instance, a healthcare widget A can be encoded with indications of widgets most frequently associated with the healthcare widget A by a particular mashup author community and configuration of the associations. When the widget is downloaded from a host site, the data would carry with the widget. Alternatively, already deployed widgets can be updated with the information. To prevent from bloating the widget, the data can be limited to a threshold of data (e.g., only information about the top 2 most associated widgets by the healthcare community in a particular hospital group will be encoded in the widget).

FIG. 2 illustrates a dynamic metadata store, according to some example embodiments. In this example, the dynamic metadata store 108 comprises three different databases (an association database 202, a mashup database 204, and a user database 206). The dynamic metadata store 108 can include other databases. For example, the dynamic metadata store 108 can include a widget database for storage of various attributes of widgets that can be part of a mashup. Embodiments can also implement the data in fewer databases, a collection of data structures that are not necessarily part of a database management system, etc.

The association database 202 comprises entries for widget associations that are created or updated after users create/update a widget association in a mashup. A widget association defines a relationship between two widgets in the mashup. For example, the output of a first widget is input for a second widget. To illustrate, a first widget that produces a location in terms of latitude/longitude can be inputted into a second widget that displays a map. With reference to FIG. 1, after a widget association is transmitted as part of mashup activity 130 from the prior user A device 102 to the mashup server 107, the mashup module 111 creates a new entry (if there is no entry for the widget association) or updates an existing entry (if there already is an entry for the widget association). The association database 202 can include entries for the following: an association identification 210, a widget A identification 212, a widget B identification 214, a direction of dataflow 216, a type of data 218, a user identification 220, and statistical data 222.

The association identification 210 stores a unique identifier among widget associations stored in the association database 202. The widget A identification 212 stores the identifier of the first of the two widgets that are part of the association. The widget B identification 214 stores the identifier of the second of the two widgets that are part of the association. The direction of dataflow 216 stores an indication of whether the output flows from widget A to widget B or vice versa. The type of data 218 stores an indication of the type of data that flows between the two widgets (e.g., integer, Boolean, character, etc.). The user identification 220 stores the identification of the user. The user identification is also used to cross reference into other databases in the dynamic metadata store 108 (as further described below). For example, a cross reference can be performed to determine a user role and social networking data for the user that created the association. The statistical data 222 indicates statistics about the widget association. An example statistic can be frequency of association between the two widgets. Accordingly, each time this same widget association is used in a mashup, the frequency of use of association between the two widgets is incremented. Another example statistic is frequency that a particular widget mediates between multiple widgets. Additional data about widget associations can also be maintained. For example, data can be maintained to indicate widget chains or intermediary widgets for a set of widgets (e.g., 80% of mashups associated widget A and widget B with a chain of widgets D-E-F in between). As another example, data can indicate that 75% of mashups that associated widget A and widget B associated an identifiable script to process data generated from the association of widgets A and B.

The mashup database 204 comprises entries for mashups that are created or updated after users create/update a mashup. A mashup can comprise one to N number of widgets and one to N number of widget associations. The mashup database 204 includes entries for the following: a mashup identification 230, a topic 232, widgets 234, widget associations 236, user identification 238, and statistical data 240.

The mashup identification 230 stores a unique identifier among mashups stored in the mashup database 204. The topic 232 stores a subject matter description and/or keywords relevant to mashups (classic cars, process improvements in a retail environment, medicine, legal, home improvement, etc.). The widgets 234 store the identifications of the widgets that are part of the mashup. The widget associations 236 store the association identification of the widget associations that are part of the mashup (see 210 described above). The user identification 238 stores the identification of the user. The user identification is also used to cross reference into other databases in the dynamic metadata store 108 (as further described below). The statistical data 240 stores statistical data regarding the mashup. An example statistic can be frequency use of the mashup. Accordingly, each time this same mashup is used, the frequency of use of the mashup is incremented. Other examples of data that can be collected/maintained for a mashup layout, data used, how often the mashup has been copied by others as a template, how often the mashup itself is used, etc.

The user database 206 comprises entries for users that create or update mashups. The user database 206 can include entries for the following: a user identification 250, a user role 252, social networking data 254, and statistical data 256. The user identification 250 stores the identification of the user. The user identification is also used to cross reference into other databases in the dynamic metadata store 108 (as further described below). The user role 252 can be defined as the user profession, type of product produced by the user's profession, where the user works, the type of business for which the user work (e.g., auto industry, retail store, etc.) etc. The social networking data 254 can include any type of data retrieved from one or more social networks. For example, the social networking data 254 can include a list of friends of the user, associations that the user has joined in the social network, the geographic location of the user, interests of the user, popularity rating of a user as a mashup builder, rating of a user by other mashup builders, etc. The social networking data can also include at least some of this same information for the friends of the user. The statistical data 256 stores statistical data regarding the user. Example statistical data can be number of social network contacts, number of mashups created, frequency in which this user creates new mashups (implying level of experience), social attributes associated with this user (including self-identified interest areas), percentage or number of mentions of the user as being an expert by others, etc. Embodiments are not limited to maintaining data about individual mashup authors. Embodiments can maintain data about mashup author communities (e.g., a database of mashup author intelligence communities that includes different mashup author communities for different geographic regions). An entry or record for a particular community can comprise a description or keywords about the community, an identifier for the community, etc. Mashups created by members of the community and information about widgets used in those mashups can be tied to the community or the individual (or team) that created the mashup.

Figure 3:
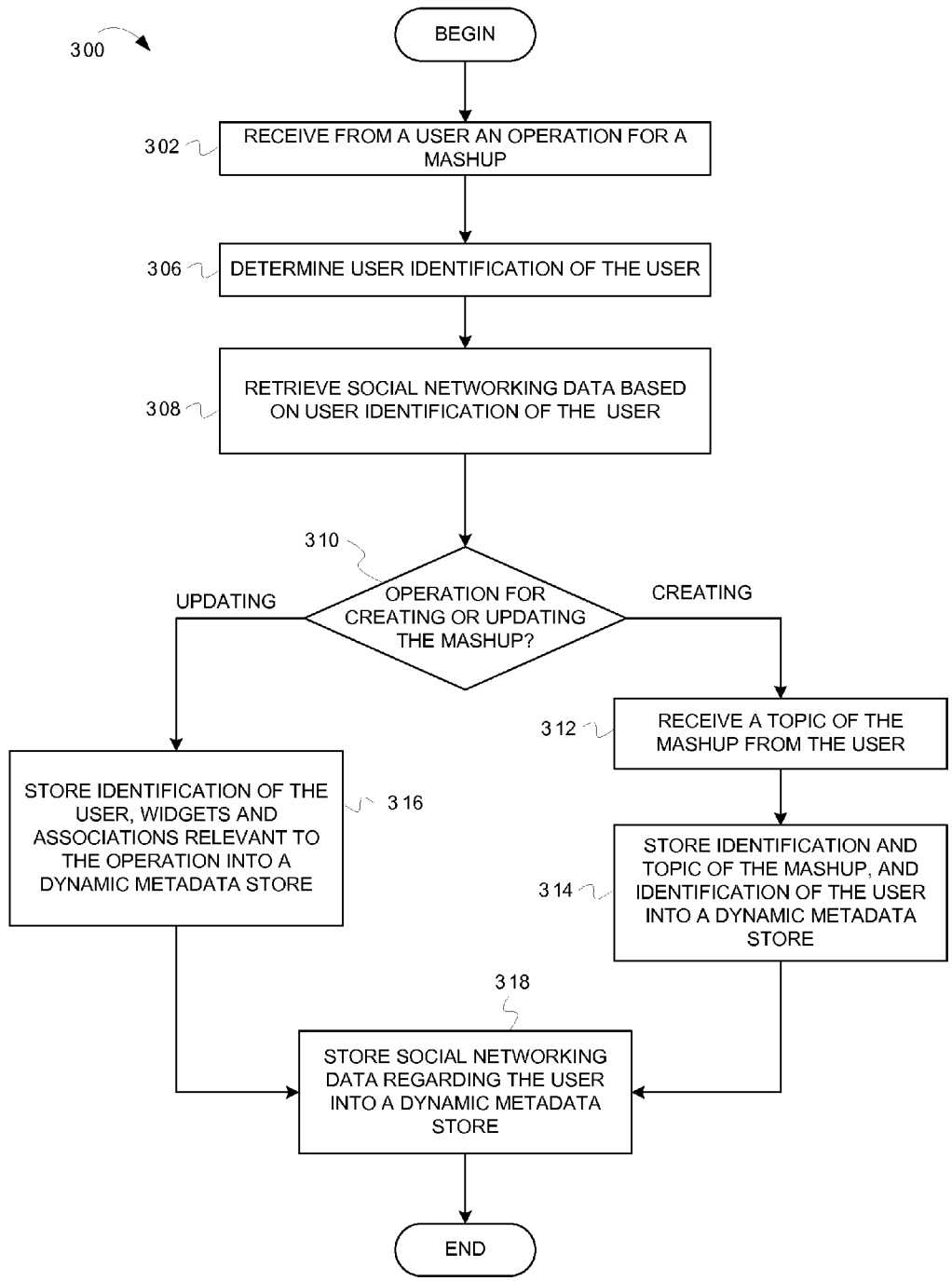
FIG. 3 is a flowchart of operations for storage of mashup activity for subsequent use by future mashup development, according to some example embodiments.
Figure 4:
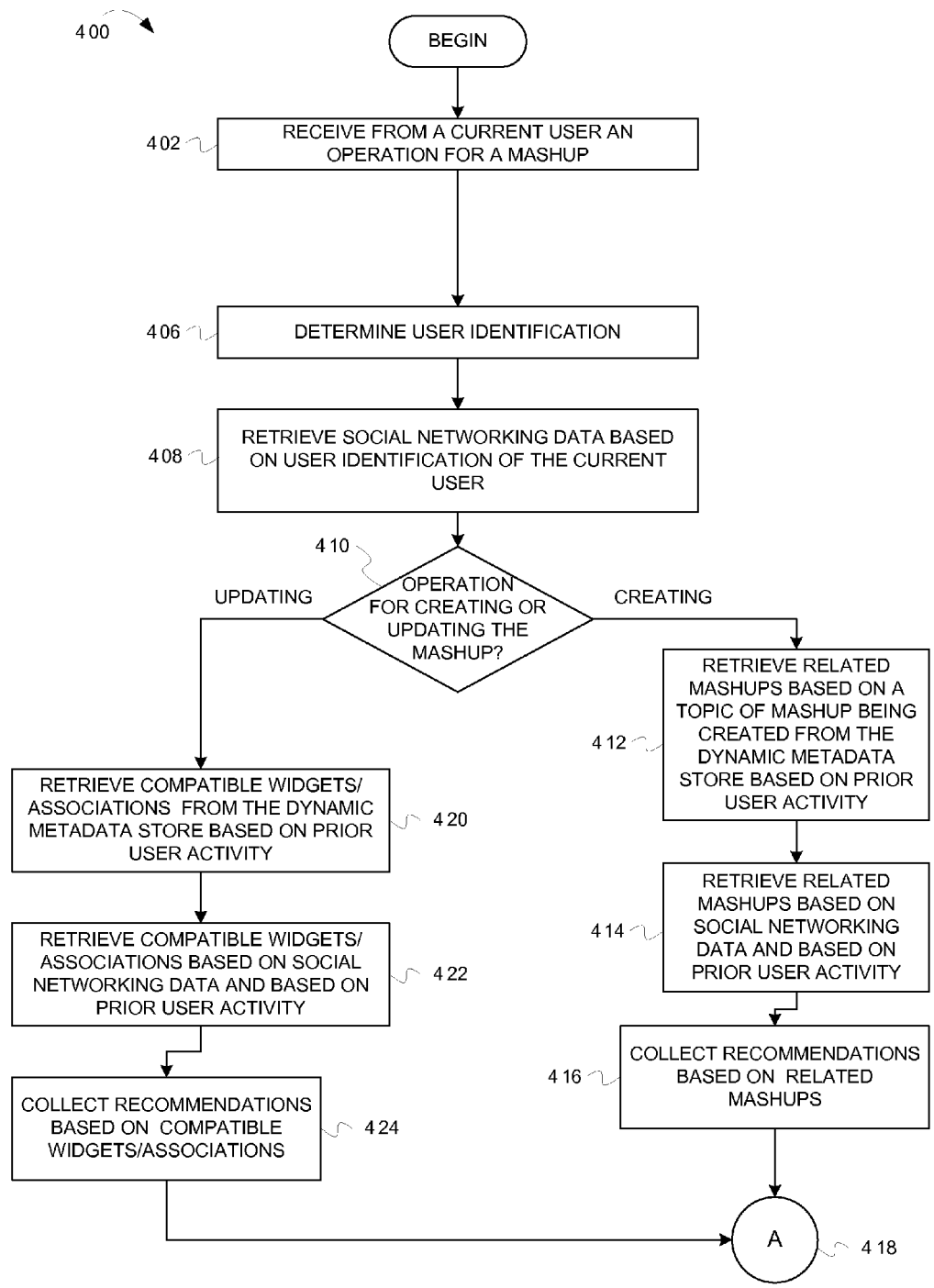
FIGS. 4-5 are flowcharts of operations for mashup development based on prior user-based activity, according to some example embodiments.
Figure 5:
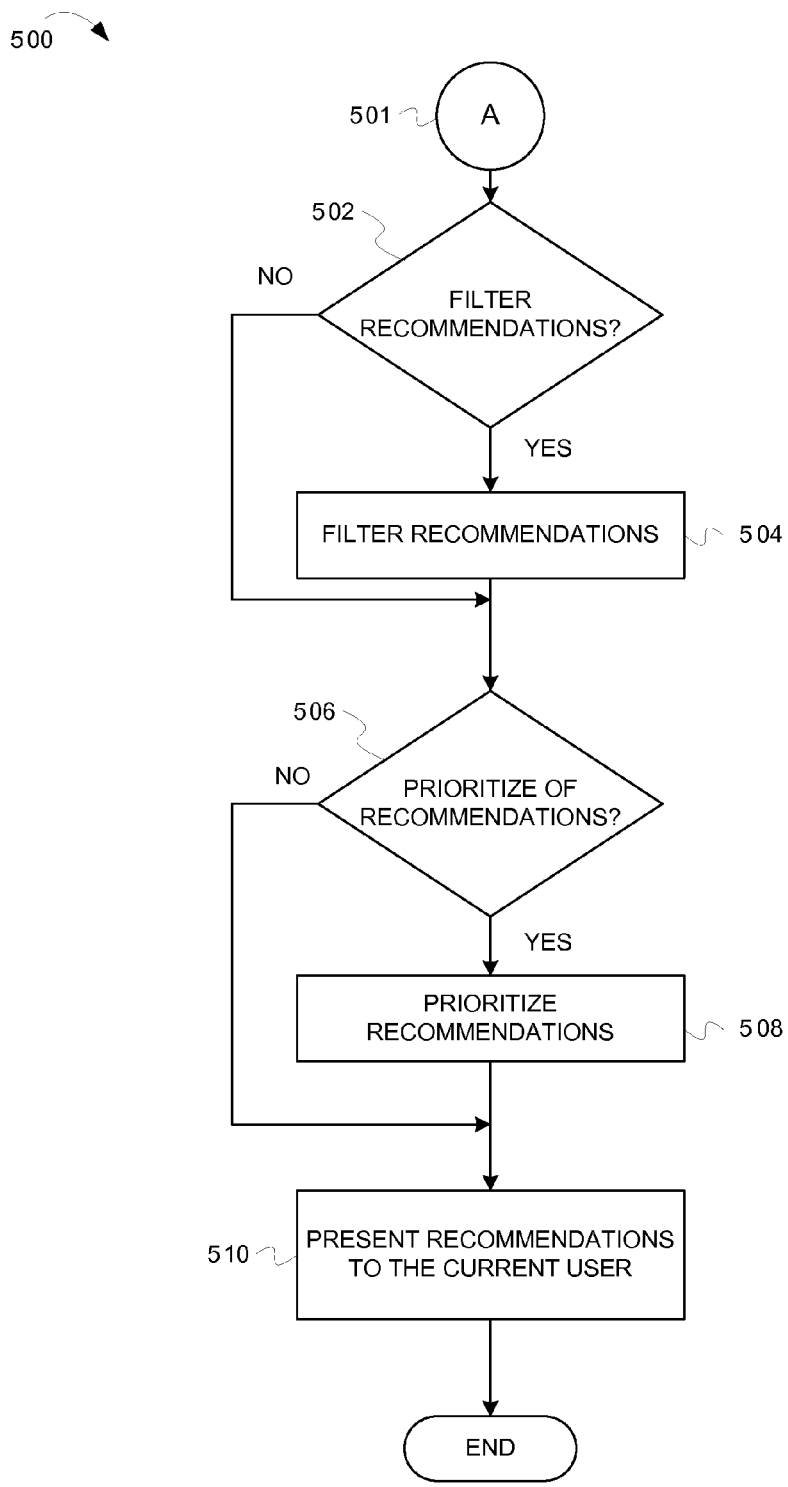

Operations for mashup creation using prior user-based activity are now described. In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flowchart. Three flowcharts are now described. FIG. 3 illustrates operations storage of mashup activity that is subsequently used for future mashup development. FIGS. 4-5 illustrate operations for mashup development based on prior user-based activity. FIGS. 3-5 are described with reference to FIGS. 1-2. While the operations of FIG. 3 and the operations of FIGS. 4-5 are described as executing on separate devices at separate times, some example embodiments are not so limited. For example, a device that is receiving recommendations for mashup development (described in FIGS. 4-5) can also be storing their mashup activity and social networking data (described in FIG. 3). Accordingly, the operations can be performed consecutively or at least partially in parallel. Therefore, the current user's mashup activity can be used to provide recommendations for future users.

FIG. 3 is a flowchart of operations for storage of mashup activity for subsequent use by future mashup development, according to some example embodiments. With reference to FIG. 1, a flowchart 300 illustrates operations performed by the mashup module 111 in the mashup server 107.

The mashup module 111 receives indication of a mashup building operation for a mashup (302). With reference to FIG. 1, the mashup module 111 receives the prior mashup activity 130 from the prior user A. The mashup building operation can comprise initial creation of the mashup (e.g., submitting a request to create a mashup), entering a topic or description for the mashup, adding a widget to the mashup, wiring widgets (e.g., adding an association between two widgets, defining the movement of data between two widgets based on an association), etc. Operations of the flowchart 300 continue.

The mashup module 111 determines an identity of an author(s) of the mashup (306). With reference to FIG. 1, the mashup module 111 can make this determination based on receiving the user identification as part of the data received with the prior mashup activity 130. Alternatively or in addition, the determination can be based on previous communications between the metadata server 107 and the prior user A device 102. Alternatively or in addition, the determination can be derived from a request from the mashup server 107 to the user at the device 102 to provide the user identification in response to receiving the prior mashup activity 130. The user identification can be unique relative to other users in the system 100. The user identification can be an electronic mail address, user name in the social network being used, a user name defined within the ecosystem 100, a group or community identifier, etc. Operations of the flowchart 300 continue.

The mashup module 111 retrieves social networking data based on identification of the author(s) (308). With reference to FIG. 1, the mashup module 111 retrieves social networking data from a social networking data store 110. As shown, this can be an external data store that stores social networking data from users that are members of the social network. For example, this can be from a database from Facebook, MySpace, etc. The social networking data can include a user role for this user. The user role can be defined as the user profession, type of product produced by the user's profession, where the user works, the type of business for which the user works (e.g., auto industry, retail store, etc.), etc. The social networking data can also include a list of friends of the user, associations that the user has joined in the social network, the geographic location of the user, interests of the user, etc. The social networking data can also include at least some of this same information for the friends of the user. In some example embodiments, this social networking data is retrieved at this time based on the user's current social networking data. Alternatively or in addition, this social networking data is retrieved later when a recommendation is provided to a future user that is based on this user's operations for the mashup (described in more detail below with reference to FIG. 4). Operations of the flowchart 300 continue.

The mashup module 111 determines whether the operation is for creating or updating the mashup (310). In particular, the mashup module 111 determines whether the operation is for the initial creation of a mashup or whether the operation is for updating a current mashup (e.g., adding a widget, adding a widget association, etc.). If the operation is for updating the mashup, operations of the flowchart 300 continue at 316 (further described below). If the operation is for creating the mashup, operations of the flowchart 300 continue at 312.

The mashup module 111 receives a topic of the mashup being created (312). With reference to FIG. 1, this topic of the mashup can be received as part of the prior mashup activity 130. Alternatively, the mashup server 107 can request the topic of the mashup from the user, in response to receiving the prior mashup activity 130. The topic can be any type of subject matter relevant to mashup creation (classic cars, process improvements in a retail environment, medicine, legal, home improvement, etc.). Operations of the flowchart 300 continue.

The mashup module 111 stores an identifier of the mashup, topic of the mashup and identification of the author into the dynamic metadata store (314). With reference to FIG. 2, the mashup module 111 creates an entry in the mashup database 204 and fills in the mashup identification 230, the topic 232, and the user identification 238 for the entry. Because this is the initial mashup creation, there are no widgets or widget associations initially in the mashup. Accordingly, these parts of the entry (the widgets 234 and the widget associations 236) can be subsequently updated as the user adds the widgets and widget associations to the associated mashup. Also, the mashup module 111 can update the statistical data 240 as necessary (as described below). In addition, an identifier of a team or community associated with the author can be stored in addition to or instead of an identification of the author. Operations of the flowchart 300 continue.

The mashup module 111 stores the social networking data regarding the author into the dynamic metadata store (318). With reference to FIG. 2, the mashup module 111 creates an entry in the user database 206 (assuming that an entry for the user has not already been created). The mashup module 111 fills in the entry for the user identification 250. Using the social networking data, the mashup module 111 can fill in the entry for the user role 252 and one to N number of different types of social networking data (as described above) into the social networking data 254. Also, the mashup module 111 can update the statistical data 256 as necessary (as described below). Operations of the flowchart 300 are complete.

Returning to 310, if the operation is for updating the mashup, operations of the flowchart 300 continue at 316. The mashup module 111 stores the identification of the author, and any widgets or widget associations relevant to the mashup operation (received) into the dynamic metadata store (316).

With reference to FIG. 2, if a widget association is being added to a mashup, the mashup module 111 creates an entry in the association database 204. The mashup module 111 can fill in the association identification 210 (defined for this widget association), the widget A identification 212 (for the first widget that is part of the association), the widget B identification 214 (for the second widget that is part of the association), the direction of the dataflow 216 (between the two widgets in the association), the type of data 218 (that is part of the dataflow), and the user identification 220 (for the user). The mashup module 111 can also update the statistical data 222 as necessary. Also for a widget association, the mashup module 111 can also update the entry in the mashup database 204 for the associated mashup. In particular, the mashup module 111 can add the identification of the widgets into the widgets 234 and the association into the widget associations 236. If the operation is a reuse of a widget association, the mashup module 111 can update the statistical data 222 (e.g., update frequency of use for the association). Operations of the flowchart 300 continue at 318 (which are described above).

Embodiments are not, however, limited to the example operations depicted by FIG. 3. Embodiments can collect mashup information (e.g., widget associations, mashup layouts, event of message configurations, mashup author social networking data, etc.) incident to a mashup being saved or published. For instance, when a mashup is published to an online store of mashups or mashup directory, the mashup information for the mashup being published can be collected. The mashup can be evaluated to determine the mashup information (e.g., analyze the structure of the mashup), the mashup information may be stored in the mashup, etc. If not already associated with the mashup, then the mashup information about author's social network, widget associations, etc., can be stored. The collected mashup information can then be examined to collect statistical data. For example, the collected mashup information can indicate that the author is a member of a healthcare social network, the layout of the mashup, and the utilized widgets and/or content generators. Multiple database about content generator/widget use and associations can then be updated. A database for healthcare mashups can be updated to reflect the content generators/widgets associated in the mashup (e.g., increment a count of the total mashups that use a particular drug side effect data source in association with a particular drug compatibility evaluation service). Other statistical data can be derived based on the collected information. For instance, the percentage of mashups created by expert mashup authors that use the drug side effect data source in association with the drug compatibility evaluation service as well as percentage of total mashup authors within corresponding social networks that make the same associations.

With the collected mashup information, a mashup builder can guide a mashup author with recommendations based on the collected information. For instance, a mashup builder can correlate a purpose or topic description/keywords to identify common cores of relevant mashups created by other mashup authors in a social network that corresponds to a mashup being created or to a mashup author. When a mashup author initially creates a mashup, the mashup builder can prompt the author for a topical description or keywords for the mashup to be created. The mashup builder can then identify a group of mashups that are relevant based on the topical description and membership of corresponding authors in a same foodie community as the author. The mashup builder can then evaluate the group of mashups to determine that the mashups use a same set of 3 widgets and a same configuration for the various mashups. The mashup builder can then populate the mashup design canvas with the core widgets as a recommended starting point for the author. The mashup builder can correlate a variety of attributes, parameters, data, etc., to make recommendations for widgets during the mashup design process. For example, the mashup builder can formulate a recommendation based on correlating hobbies of mashup authors, geographic location, expertise, in mashup building, etc. In addition, recommendations are not limited to which widgets to add to a design canvas. A mashup builder can formulate recommendations for other mashup configurations. For instance, the mashup builder can recommend a particular wiring or message configuration based on frequency of the wiring or message configuration by mashup authors in a relevant social network, for example. Operations for providing recommendations based on prior user-based activity of mashups are now described. In particular, FIGS. 4-5 are flowcharts of operations for mashup development based on prior user-based activity, according to some example embodiments. With reference to FIG. 1, the operations of flowcharts 400 and 500 can be performed by the recommendation module 112.

The recommendation module 112 receives from a current user an operation for a mashup (402). With reference to FIG. 1, the recommendation module 112 receives an operation for a mashup that was executed on the current user device 105. The operation can comprise initial creation of the mashup, adding a widget to the mashup, adding an association between two widgets, defining the movement of data between two widgets based on an association, etc. Operations of the flowchart 400 continue.

The recommendation module 112 determines a user identification of the current user (406). With reference to FIG. 1, the recommendation module 112 can make this determination based on receiving the user identification as part of the data received with operation for the mashup. Alternatively or in addition, the determination can be based on previous communications between the metadata server 107 and the current user device 105. Alternatively or in addition, the determination can be derived from a request from the mashup server 107 to the user at the device 105 to provide the user identification in response to receiving the operations for the mashup. The user identification can be unique relative to other users in the system 100. The user identification can be an electronic mail address, user name in the social network being used, a user name defined within the system 100, etc. Operations of the flowchart 400 continue.

The recommendation module 112 retrieves social networking data based on user identification of the current user (408). With reference to FIG. 1, the recommendation module 112 retrieves social networking data from a social networking data store 110. As shown, this can be an external data store that stores social networking data from users that are members of the social network. The social networking data can include a user role for this user. The user role can be defined as the user profession, type of product produced by the user's profession, where the user works, the type of business for which the user work (e.g., auto industry, retail store, etc.) etc. The social networking data can also include a list of friends of the user, associations that the user has joined in the social network, the geographic location of the user, interests of the user, etc. The social networking data can also include at least some of this same information for the friends of the user. Operations of the flowchart 400 continue.

The recommendation module 112 determines whether the operation is for creating or updating the mashup (410). In particular, the recommendation module 112 determines whether the operation is for the initial creation of a mashup or whether the operation is for updating a current mashup (e.g., adding a widget, adding an association, etc.). If the operation is for updating the mashup, operations of the flowchart 400 continue at 420 (further described below). If the operation is for creating the mashup, operations of the flowchart 400 continue at 412.

The recommendation module 112 retrieves related mashups based on the topic of the mashup being created from the dynamic metadata store based on prior user activity (412). In particular, as part of the initial mashup creation, the recommendation module 112 can request that the current user provide a topic (i.e., a subject matter) for the mashup (as described above). With reference to FIG. 2, the recommendation module 112 can then locate mashups currently stored in the mashup database 204 that are relevant to the topic of the current mashup. For example, the recommendation module 112 can perform a word search within the topics stored in the topic 232 to locate relevant mashups. For example, the recommendation module 112 can locate all mashups related to classic cars, home improvement, etc. Operations of the flowchart 400 continue.

The recommendation module 112 retrieves related mashups based on social networking data and based on prior user activity (414). With reference to FIG. 2, the recommendation module 112 can locate mashups currently stored in the mashup database 204 that are relevant based various aspects of the social networking data of the current user and relative to the prior user activity. For example, the recommendation module 112 can use the user database 206 to find previous users having similar interests, similar professional roles, geographic locations, etc. The recommendation module 112 can then locate mashups of these relevant previous users based on the user identification 238. Operations of the flowchart 400 continue.

The recommendation module 112 collects the recommendations based on the related mashups (416). For example, the collection can be a combining of the related mashups based on the topic and the related mashup based on the social networking data. In some example embodiments, the collection can be maintaining only those mashups that overlap between the two related mashup groups (the mashups located by topic and the mashups located by social networking data). Operations of the flowchart 400 continue at 418, which is a continuation point that continues at a point 501 of the flowchart 500.

Returning to 410, if the operation is for updating the mashup, operations of the flowchart 400 continue at 420. The recommendation module 112 retrieves compatible widgets and widget associations from the dynamic metadata store based on prior user activity (420). In particular, in response to receiving an operation for the mashup, the recommendation module 112 locates widgets and widget associations that are compatible with the operation for the mashup. For example with reference to FIG. 1, if the operation performed by the current user was to add a widget to the mashup 116 on the mashup canvas 114, the recommendation module 112 can locate widgets and widget associations that have been previously combined with this added widget. With reference to FIG. 2, the recommendation module 112 can traverse the columns for the widget A identification 212 and the widget B identification 214 of the association database 202 to locate the identification for the added widget. If the added widget identification is located, the recommendation module 112 can retrieve the associated entry in the associated database 202. For example, if the added widget identification is located in the widget A identification 212, the recommendation module 112 can retrieve the association identification 210, the widget B identification 212, the direction of dataflow 216, the type of data 218 and the user identification 220. In some example embodiments, instead of the widget association, the recommendation module 112 can just provide the widget identified by the widget B identification 214. In some example embodiments, the recommendation module 112 can traverse the data for the widgets 234 in the mashup database 204. Accordingly, if the added widget identification is located in the mashup database, the recommendation module 112 can retrieve the associated entry. For example, the recommendation module 112 can provide the mashup identification 230, the topic 232, the identification of other widgets in the mashup (234), the widget associations 236, and the user identification 238. To illustrate, if the mashup operation performed by the current user is a widget association that is used in a different mashup that has a high frequency of use (per the relevant heuristics), the recommendation module 112 can provide all of the widgets, widget associations, etc. for this different mashup as part of the recommendation.

In another example, assume the mashup operation performed by the current user is to add a widget and there is an existing widget on the mashup canvas. Also, assume that the added widget cannot be directly associated with the existing widget and that an intermediary widget can be associated in between the two (based on prior user activity). The recommendation module 112 can provide a recommendation to add the intermediary widget and two associations—an association between the added widget and the intermediary widget and an association between the existing widget and the intermediary widget. Operations of the flowchart 400 continue.

The recommendation module 112 retrieves compatible widgets and widget associations from the dynamic metadata store based on the social networking data and prior user activity (422). With reference to FIG. 2, the recommendation module 112 can locate widgets and widget associations stored in the association database 202 that are relevant based on various aspects of the social networking data of the current user and relative to the prior user activity. For example, the recommendation module 112 can use the user database 206 to find previous users having similar interests, similar professional roles, geographic locations, etc. The recommendation module 112 can then locate widgets and widget associations created by these relevant previous users based on the user identification 220 in the association database 202. Operations of the flowchart 400 continue.

The recommendation module 112 collects the recommendations based on the compatible widgets and widget associations (424). For example, the collection can be a combining of 1) the widgets and widget associations located based on the widgets or widget associations involving the operations of the mashup by the current user, and 2) the widgets and widget associations located based on social networking data of the current user. In some example embodiments, the collection can be a collection of only those mashups that overlap between the two groups of located widgets and widget associations (the widgets and widget associations located based on the operation of the mashup by the current user and the widgets and widget associations located based on social networking data). Operations of the flowchart 400 continue at 418, which is a continuation point that continues at the point 501 of the flowchart 500.

Operations of the flowchart 500 (that are a continuation of the operations of the flowchart 400) are now described. The recommendation module 112 determines whether to filter the recommendations (502). In some example embodiments, this determination is made by the user. The user can also define the type of filtering as further described below. If there is no filtering of the recommendations, operations continue at 506 (described below). Otherwise, operations of the flowchart 500 continue at 504.

The recommendation module 112 filters the recommendations (504). In some example embodiments, the recommendation module 112 can filter based on filters defined by the current user. An example filter can filter to provide only those mashups, widgets or widget associations that are provided because of social networking data. Another example filter can filter to provide only those mashups, widgets or widget associations that are provided because of a specific type of social networking data (based on the user role, geographic location, friends, etc.). Another example filter can filter to provide only those mashups, widgets or widget associations that are provided without any social networking data. Another example filter can filter to provide only those mashups, widgets or widget associations that were created no earlier than a given date (e.g., no earlier than one year ago). Another example filter can filter to provide only those mashups, widgets or widget associations that were created by specific users. While the filtering is described after collecting of the recommendations, in some example embodiments, the filtering can occur prior to locating retrieving the data. For example, the filtering can occur prior to the operation at 408. Operations of the flowchart 500 continue.

The recommendation module 112 determines whether to prioritize the recommendations (506). In some example embodiments, this determination is made by the user. The user can also define the type of prioritizing as further described below. If there is no prioritizing of the recommendations, operations continue at 510 (described below). Otherwise, operations of the flowchart 500 continue at 508.

The recommendation module 112 prioritizes the recommendations (508). In some example embodiments, the recommendation module 112 can prioritize based on priorities defined by the current user. An example priority can be based on one or more of the relevant heuristics. For example, the priority can be based on frequency used, used by friends of the current user, by other users having a same user role, etc. Operations of the flowchart 500 continue.

The recommendation module 112 presents the recommendations to the current user (510). In particular, the recommendation module 112 can transmit these recommendations for presentation on the current user display 106. The recommendations can be by highlighting and/or adding widgets, widget associations or mashups to a selectable palette, by adding the widgets or widget associations to the mashup canvas 114, etc. The operations of the flowchart 500 are complete. While described with processing one mashup operation, the operations of FIGS. 3-5 can restart each time a user performs a mashup operation.

Figure 6:
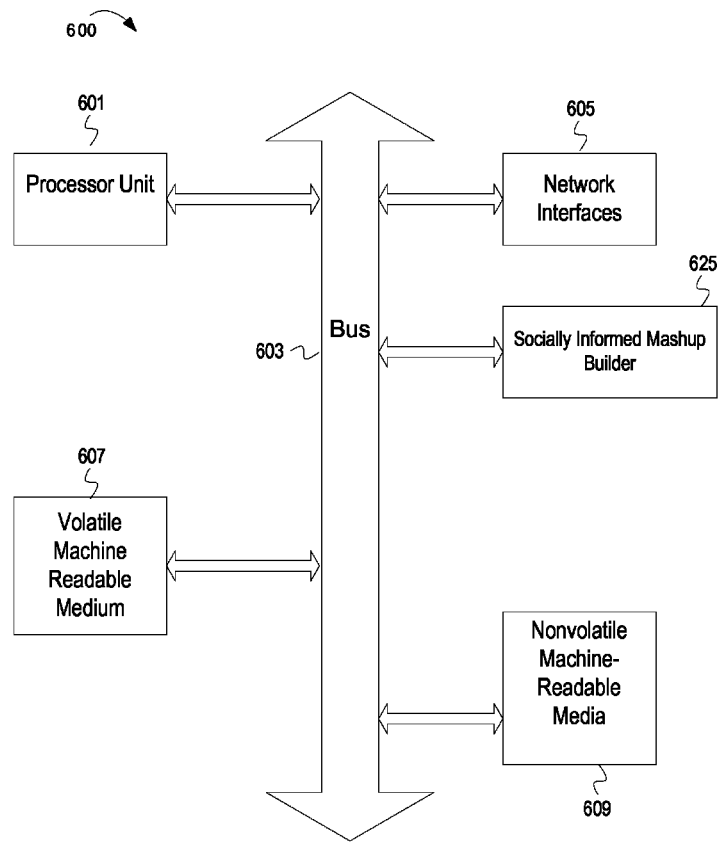
FIG. 6 is a block diagram illustrating a computer system, according to some example embodiments.

FIG. 6 is a block diagram illustrating a computer system, according to some example embodiments. FIG. 6 can be representative of any one of the devices, server, etc. shown in FIG. 1. For example, FIG. 6 can be representative of the prior user A device 102, the prior user N device 104, the mashup server 107 or the current user device 105. A computer system 600 includes a processor unit 601 (possibly including multiple processors, multiple cores, multiple nodes, and/or implementing multi-threading, etc.). The computer system 600 includes a volatile machine-readable medium 607. The volatile machine-readable medium 607 can be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 600 also includes a bus 603 (e.g., PCI, ISA, PCI-Express, HyperTransport®, InfiniBand®, NuBus, etc.), a network interface 605 (e.g., an ATM interface, an Ethernet interface, a Frame Relay interface, SONET interface, wireless interface, etc.), and a nonvolatile machine-readable media 609 (e.g., optical storage, magnetic storage, etc.). The nonvolatile machine-readable media 609 can be representative of the data storage pool 102 of FIG. 1. The computer system 600 also includes a social network informed mashup builder 625. The mashup builder 625 collects mashup configuration data from a data repository of mashup configuration data of relevant mashups that are similar in topic and/or made by mashup authors within one more social networks that corresponds to the mashup being built (edited or created) and/or a current mashup author. The mashup builder can implement the functionality described herein as a separate component (e.g., an application specific integrated circuit, a FPGA, co-processor, etc.) coupled with the bus 603. Embodiments can also implement at least some of the functionality of the mashup builder with computer readable program code. In addition, the mashup builder 625 can also be implemented with computer readable program code stored in at least one of the mediums 607, 609 and executable by the processor unit 601.

Further, realizations may include fewer or additional components not illustrated in FIG. 6 (e.g., video cards, audio cards, additional network interfaces, peripheral devices, etc.). The processor unit 601, the storage device(s) 609, and the network interface 605 are coupled to the bus 603. Although illustrated as being coupled to the bus 603, the memory 607 may be coupled to the processor unit 601.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for formulating mashup building recom-

What is claimed is:

1. A method comprising:
performing, by a processor, the following operations in response to creating a current mashup:
identifying a current mashup author of the current mashup;
identifying a user role of the current mashup author as defined in a social network;
identifying a community of other mashup authors having the user role, wherein the community is determined based on an identified interest that is the same for the current mashup author and the other mashup authors;
identifying a plurality of mashups created by the other mashup authors indicated as being in the community in response to an indication of a mashup building operation of the current mashup has occurred;
determining statistical information about a plurality of mashup configurations used by the other mashup authors in the plurality of mashups according to data about the plurality of mashups; and
generating a set of one or more recommendations that are associated with a set of one or more of the plurality of mashup configurations for the current mashup.

2. The method of claim 1 further comprising wherein the determining of the community of other mashup authors is based, at least in part, on social network data.

3. The method of claim 2, wherein said determining the community of other mashup authors comprises determining correlations between at least one of data about the other mashup authors and a topic of the current mashup, data about the community and the topic of the current mashup, and data about the community and data about the current mashup author.

4. The method of claim 1, wherein said identifying the plurality of mashups created by the other mashup authors indicated as being in the community comprises querying a database of mashup information with at least one of social network data about the current mashup author, identifier of the current mashup author, and a topic of the current mashup.

5. The method of claim 1 wherein the plurality of mashup configurations comprise at least one of mashup layout, message configuration, event configuration, association of content generators, and wiring of widgets.

6. The method of claim 1, wherein said generating the set of one or more recommendations that are associated with the set of one or more of the plurality of mashup configurations for the current mashup comprises at least one of displaying an indication of a set of one or more widgets to add to a mashup design canvas, displaying an indication of a set of one or more widgets to connect to a currently selected widget, displaying an indication of how to wire together two widgets, and displaying an indication of how to configure a message or event to be transmitted between widgets.

7. The method of claim 1, wherein the plurality of mashups comprise variations of mashups.

8. The method of claim 1, wherein the current mashup comprises an instance of at least one of the plurality of mashups.

9. The method of claim 1, wherein the mashup building operation comprises one of creating the mashup, indicating a topic or description for the current mashup, adding a widget to the current mashup, and wiring widgets in the current mashup.

10. The method of claim 1, wherein said generating the set of one or more recommendations that are associated with the set of one or more of the plurality of mashup configurations for the current mashup comprises transmitting the set of one or more recommendations to a mashup builder associated with the current mashup.

11. A computer program product for informing building of a mashup with social network data, the computer program product comprising:
a non-transitory computer readable storage medium having computer readable program code embodied therewith, the computer readable program code comprising:
computer readable program code configured to,
perform the following operations in response to creating a current mashup:
identify a current mashup author of the current mashup;
identify a user role of the current mashup author as defined in a social network;
identify a community of other mashup authors having the user role, wherein the community is determined based on an identified interest that is the same for the current mashup author and the other mashup authors;
identify a plurality of mashups built by the other mashup authors that correlate with the current mashup author;
examine statistical data about mashup configurations of the plurality of mashups; and
recommend a set of one or more of the mashup configurations for the current mashup based, at least in part, on the statistical data.

12. The computer program product of claim 11, wherein the mashup configurations comprise at last one of mashup layout, message configuration, event configuration, association of content generators, and wiring of widgets.

13. The computer program product of claim 11, wherein the statistical data comprises at least one of widget association statistics, widget wiring statistics, message configuration statistics, mashup use statistics, and mashup author statistics.

14. The computer program product of claim 11, wherein the computer readable program code is also configured to identify the plurality of mashups also based, at least in part, on social network data about the plurality of mashups.

15. The computer program product of claim 11, wherein the computer readable program code also comprises computer readable program code configured to filter the mashup configurations.

16. The computer program product of claim 11, wherein the computer readable program code also comprises computer readable program code configured to prioritize the set of one or more of the mashup configurations.

17. A computer program product for informing building of a mashup with social network data, the computer program product comprising:
a non-transitory computer readable storage medium having computer readable program code embodied therewith, the computer readable program code comprising:
computer readable program code configured to,
perform the following operations in response to creating a current mashup:
identify a current mashup author of the current mashup;
identify a user role of the current mashup author as defined in a social network;
identify a community of other mashup authors having the user role, wherein the community is determined based on an identified interest that is the same for the current mashup author and the other mashup authors;
identify a plurality of mashups created by the other mashup authors indicated as being in the community in response to indication of a mashup building operation;
identify frequency of a plurality of mashup configurations used by the other mashup authors in the plurality of mashups according to data about the plurality of mashups; and
generate a set of one or more recommendations that are associated with a set of one or more of the plurality of mashup configurations for the current mashup.

18. The computer program product of claim 17, wherein the computer readable program code configured to identify the community of the other mashup authors comprises computer readable program code configured to identify the community of the other mashup authors based, at least in part, on the social network data.

19. The computer program product of claim 18, wherein the computer program product configured to identify the community relevant of the other mashup authors comprises the computer readable program code being configured to identify correlations between at least one of data about the other mashup authors and a topic of the current mashup, data about the community and the topic of the current mashup, and data about the community and data about the current mashup author indicated for the current mashup.

20. An apparatus comprising:
a processor;
a network interface; and
a mashup recommendation module operable to,
perform the following operations in response to creating a current mashup:
identify a current mashup author of the current mashup;
identify a user role of the current mashup author as defined in a social network;
identify a community of other mashup authors having the user role, wherein the community is determined based on an identified interest that is the same for the current mashup author and the other mashup authors;
identify a plurality of mashups created by the other mashup authors indicated as being in the community in response to indication of a mashup building operation;
identify frequency of a plurality of mashup configurations used by the other mashup authors in the plurality of mashups according to data about the plurality of mashups; and
generate a set of one or more recommendations that are associated with a set of one or more of the plurality of mashup configurations for the current mashup.

21. The apparatus of claim 20, wherein the mashup recommendation module is further operable to identify the community of the other mashup authors based, at least in part, on the social network data.

22. The apparatus of claim 21, wherein the mashup recommendation module being operable to identify the community of the other mashup authors comprises the mashup recommendation module being operable to identify correlations between at least one of data about the other mashup authors and a topic of the current mashup, data about the community and the topic of the current mashup, and data about the community and data about the current mashup author indicated for the current mashup.

23. The method of claim 1, wherein the user role of the current mashup author as defined in the social network comprises a user profession of the current mashup author as defined in the social network.

24. The method of claim 23, wherein the user role of the current mashup author as defined in the social network comprises a type of product produced by the user profession.

25. The method of claim 24,
wherein the following operations in response to creating the current mashup comprise
identifying a first group of one or more mashup configurations that are specific to the user role of the current mashup author;
identifying a topic defined for the current mashup;
identifying a second group of one or more mashup configurations that are specific to the topic defined for the current mashup; and
determining one or more mashup configurations that overlap in the first group and the second group to create an overlap group of one or more mashup configurations;
wherein the set of one or more of the plurality of mashup configurations for the mashup comprises the overlap group of the one or more mashup configurations.

26. The method of claim 1, wherein the user role of the current mashup author as defined in the social network comprises a type of business for which the current mashup author works.

27. The computer program product of claim 11, wherein the user role of the current mashup author as defined in the social network comprises a user profession of the current mashup author as defined in the social network.

28. The computer program product of claim 27, wherein the user role of the current mashup author as defined in the social network comprises a type of product produced by the user profession.

29. The computer program product of claim 28,
wherein the following operations in response to creating the current mashup comprise
identify a first group of one or more mashup configurations that are specific to the user role of the current mashup author;
identify a topic defined for the current mashup;
identify a second group of one or more mashup configurations that are specific to the topic defined for the current mashup; and determine one or more mashup configurations that overlap in the first group and the second group to create an overlap group of one or more mashup configurations;

wherein the set of one or more of the plurality of mashup configurations for the mashup comprises the overlap group of the one or more mashup configurations.

30. The computer program product of claim 17, wherein the user role of the current mashup author as defined in the social network comprises a user profession of the current mashup author as defined in the social network.

31. The computer program product of claim 30, wherein the user role of the current mashup author as defined in the social network comprises a type of product produced by the user profession.

32. The computer program product of claim 31,
wherein the following operations in response to creating the current mashup comprise
identify a first group of one or more mashup configurations that are specific to the user role of the current mashup author;
identify a topic defined for the current mashup;
identify a second group of one or more mashup configurations that are specific to the topic defined for the current mashup; and
determine one or more mashup configurations that overlap in the first group and the second group to create an overlap group of one or more mashup configurations;
wherein the set of one or more of the plurality of mashup configurations for the mashup comprises the overlap group of the one or more mashup configurations.

33. The apparatus of claim 20, wherein the user role of the current mashup author as defined in the social network comprises a user profession of the current mashup author as defined in the social network.

34. The apparatus of claim 33, wherein the user role of the current mashup author as defined in the social network comprises a type of product produced by the user profession.

35. The apparatus of claim 34,
wherein the following operations in response to creating the current mashup comprise
identify a first group of one or more mashup configurations that are specific to the user role of the current mashup author;
identify a topic defined for the current mashup;
identify a second group of one or more mashup configurations that are specific to the topic defined for the current mashup; and
determine one or more mashup configurations that overlap in the first group and the second group to create an overlap group of one or more mashup configurations;
wherein the set of one or more of the plurality of mashup configurations for the mashup comprises the overlap group of the one or more mashup configurations.

* * * * *